(12) United States Patent
Symons

(10) Patent No.: US 6,403,000 B1
(45) Date of Patent: Jun. 11, 2002

(54) METHOD OF MAKING LIGNOCELLULOSIC BOARD

(75) Inventor: Michael Windsor Symons, Pretoria (ZA)

(73) Assignee: Windsor Technologies, Limited, Nassau (BS)

( * ) Notice: Subject to any disclaimer, the term of this patent is extended or adjusted under 35 U.S.C. 154(b) by 0 days.

(21) Appl. No.: 09/445,821

(22) PCT Filed: Jun. 12, 1998

(86) PCT No.: PCT/GB98/01713

§ 371 (c)(1),
(2), (4) Date: Dec. 10, 1999

(87) PCT Pub. No.: WO98/56991

PCT Pub. Date: Dec. 17, 1998

(30) Foreign Application Priority Data

| Jun. 12, 1997 | (ZA) | 97/5200 |
| Jul. 16, 1997 | (ZA) | 97/6291 |
| Mar. 30, 1998 | (ZA) | 98/2638 |

(51) Int. Cl.[7] ............................................. B27N 1/02
(52) U.S. Cl. ...................... 264/109; 156/62.2; 264/122; 264/134
(58) Field of Search ................................ 264/109, 122, 264/134, 129, 319, 320; 156/62.2, 62.4

(56) References Cited

U.S. PATENT DOCUMENTS 4,904,516 A * 2/1990 Creamer 5,473,012 A * 12/1995 Coventry et al.

FOREIGN PATENT DOCUMENTS

| DE | 1 223 535 | * | 8/1966 |
| DE | 4 223 604 | * | 1/1994 |
| EP | 107 155 | | 5/1984 |
| EP | 501 826 | * | 9/1992 |
| GB | 1 064 510 | | 4/1967 |

OTHER PUBLICATIONS

Database WPI, Week 8530 Derwent Publications Ltd. Class A82, AN 85–182725, XP002078607 & SU 1 133 098 A, Jan. 7, 1985.

* cited by examiner

*Primary Examiner*—Mathieu D. Vargot
(74) *Attorney, Agent, or Firm*—Pillsbury Winthrop LLP

(57) ABSTRACT

A method of manufacturing a finished product from a lignocellulosic material selected from the group consisting of lignocellulosic particles or fibers, soft boards, and board precursors in sheet form includes the steps of impregnating the lignocellulosic material with an impregnating composition consisting of a mineral oil and a liquid thermosetting resin, optionally with a catalyst therefor. Thereafter, the lignocellulosic material is compressed with heating to allow the mineral oil to infuse the lignocellulosic material and to polymerize the thermosetting resin to form the finished product.

16 Claims, No Drawings

METHOD OF MAKING LIGNOCELLULOSIC BOARD

BACKGROUND OF THE INVENTION

This invention relates to a method for the preparing lignocellulosic particles, soft boards and board precursors in sheet form, for the manufacture of a finished product.

It is well known to manufacture composite board products from wood derived feed stocks. Examples are medium density fibre board (MDF), high density fibre board, orientated strand board, chip board and the like. Such boards are most frequently bound by condensation resins such as the urea, melamine or resole phenol formaldehydes. A new trend is to use agricultural fibre as a feed stock, because excellent fibre is produced, the resource is rapidly regenerative, it removes the pressure on the timber resource and logistical constraints are alleviated. In this case the isocyanates are the desired binder because the nature of the surface and composition of agricultural fibres, the particle shape and specific surface area give rise to more critical binder requirements.

In the case of all lignocellulosic composite board products, plywoods, paper products and solid timber, particularly the softwoods and the marginal hardwoods, water is by far the greatest contributor to degradation.

There is therefore a requirement for the treatment of lignocellulosic products to make them highly water resistant.

This requirement may be achieved by the pre-treatment of lignocellulosic materials in particulate form as feed stock for board production, or veneers for plywood production, or by the post treatment of composite boards themselves, such as chip board or MDF, pulp and paper products and solid timber. DE 4 223 604A discloses the impregnation of cellulosic materials with a solution of one or more water-insoluble polymers, copolymers, oligomers, prepolymers or monomers (inter alia isocyanate thermosetting resins) dissolved in organic solvents (inter alia petrol).

Subsidiary improvements such as improved mechanical properties, behaviour in fire, absence of formaldehyde and resistance to microbial or insect attack may also be provided for.

There is always the need for improved methods of manufacture of products from lignocellulosic materials.

SUMMARY OF THE INVENTION

According to a first aspect of the invention there is provided a method of manufacturing a finished product from a lignocellulosic material, selected from the group consisting of lignocellulosic particles or fibres, soft boards, and board precursors in sheet form, which method includes the steps of:
  (a) impregnating the lignocellulosic material with an impregnating composition comprising:
    (i) a mineral oil; and
    (ii) a liquid thermosetting resin and, if necessary, a catalyst therefor; in the form of a dispersion of the liquid resin in the mineral oil; and
  (b) compressing the impregnated lignocellulosic material with heating to allow the mineral oil to infuse the lignocellulosic material and to polymerise the thermosetting resin to form the finished product.

When the lignocellulosic material is lignocellulosic particles or fibres, the method of the invention preferably includes a further step, step (c):
  (c) before step (a) or preferably before step (b) applying to the lignocellulosic material a thermosetting resin in finely divided dry powder form and, if necessary, a catalyst therefor, so that the thermosetting resin in finely divided dry powder form adheres to the surfaces of the lignocellulosic material.

The lignocellulosic material may be:
  A Lignocellulosic particles or fibres, for example particles, chips, flakes, strands or fibres of wood or agrifibres, e.g those sourced from annual or bi-annual agricultural crop residues, and paper pulps and the like;
  B Soft boards, by which there is meant a board which has not necessarily been impregnated or bound with a binder such as a thermosetting resin or the like. Examples are low density boards, i.e boards having a density between 180 and 400 kg/m$^3$ inclusive, formed typically by a wet process;
  C Board precursors in sheet form, by which there is meant a coherent mat of a lignocellulosic material which has not been resinated with a binder such as a thermosetting resin. An example is a mat of medium density fibre, for the production of a medium density fibre board, preferably after initial pre-pressing of the medium density fibre, but prior to the final high pressure pressing of the medium fibre to form the medium density fibre board.

It is to be noted that the impregnating composition does not contain a solvent, which gives the method certain advantages, including the fact that there is no need to remove a solvent before step (b) can be carried out.

The thermosetting resin used in step (a) must be a liquid thermosetting resin so that it can infuse the lignocellulosic material and so that a dispersion of the resin in the mineral oil is formed.

The thermosetting resin used in step (a) is preferably an isocyanate thermosetting resin or a precursor thereof, more preferably a resin derived from diphenylmethane-4,4'-diisocyanate (MDI).

The thermosetting resin in finely divided dry powder form used in step (c) is preferably a novolac resin, based upon phenol and formaldehyde.

The liquid thermosetting resin used in step (a) is preferably used in an amount of from 1% to 20% inclusive by mass of the mass of the dry lignocellulosic material, preferably from 2% to 10% inclusive by mass of the mass of the dry lignocellulosic material.

The mineral oil is preferably used in an amount of from 5% to 30% inclusive by mass of the mass of the dry lignocellulosic material, more preferably in an amount of from 10% to 20% by mass of the mass of the dry lignocellulosic material.

The thermosetting resin in finely divided dry powder form used in step (c) may be used in an amount of from 0% to 20% inclusive by mass of the mass of the dry lignocellulosic material, preferably in an amount of from 3% to 10% inclusive by mass of the mass of the dry lignocellulosic material.

Preferably, prior to step (a), the lignocellulosic material is dried to a desired moisture percentage, preferably a moisture percentage of between 5% and 20% by mass inclusive.

In step (a) the lignocellulosic material may be impregnated with the impregnating composition in any suitable manner, for example by spraying or coating the impregnating composition onto the lignocellulosic material, by mixing the impregnating composition with the lignocellulosic material in particle or fibre form in conventional mixing equipment, or, when the lignocellulosic material is a soft board or a board precursor in sheet form, applying the impregnating composition to the board or board precursor, on one or both sides, by any coating, spraying or immersion technique.

In step (b), the impregnated lilgnocellulosic material may be compressed and heated in a suitable press or mould at temperatures between 120° C. and 250° C. inclusive preferably up to 220° C. and pressures of from 2 to 70 kg/cm² inclusive preferably from 10 to 60 kg/cm² inclusive for a time from 5 seconds to 20 seconds inclusive per mm of thickness, to allow the mineral oil to infuse the lignocellulosic material and to polymerise the thermosetting resin or resins present.

The impregnating composition may also include various optional components such as:

(iv) a preservative such as a bactericide, fungicide or insecticide, or the like preferably in an amount of from 0.25% to 10% inclusive by mass of the impregnating composition of the preservative;

(v) a wax soluble in the impregnating composition at elevated temperature or a wax in dry particle form;

(vi) other additives selected from fire retardants, ultraviolet light absorbers, and anti-oxidants, and the like According to a second aspect of the invention there is provided a method of preparing an impregnated lignocellulosic material from a lignocellulosic material selected from the group consisting of lignocellulosic particles or fibres, soft boards, and board precursors in sheet form, for the manufacture of a finished product, which method includes the step of:

(a) impregnating the lignocellulosic material with an impregnating composition comprising:
   (i) a mineral oil; and
   (ii) a liquid thermosetting resin and, if necessary, a catalyst therefor;
   in the form of a dispersion of the liquid resin in the mineral oil.

When the lignocellulosic material is lignocellulosic particles or fibres, the method may include a further step, step (c), before or after step (a):

(b) before or after step (a) applying to the lignocellulosic material a thermosetting resin in finely divided dry powder form and, if necessary, a catalyst therefor so that the thermosetting resin in finely divided dry powder form adheres to the surfaces of the lignocellulosic material.

DESCRIPTION OF EMBODIMENTS

The crux of the invention is a method of manufacturing a finished product from a lignocellulosic material selected from the group consisting of lignocellulosic particles or fibres, soft boards, and board precursors in sheet form.

Lignocellulosic material refers to any plant material emanating from the photosynthetic phenomenon.

The lignocellulosic material may be firstly lignocellulosic particles or fibres such as for example feedstock for the manufacture of a composite board product such as chip board, particle board, medium density fibre board, orientated strand board and the like. The feedstock may be in the form of particles, uni fibres or small fibre bundles, strands, flakes or chips of wood or alternatively short fibrous lengths extracted from agrifibre feedstock such as annual or bi-annual agricultural plants, particularly crop waste, such as hemp, sisal, cotton stalk, wheat or other cereals, straw, bamboo, jute, salt water reeds, palm fronds, flax, groundnut shells, grain husks and similar.

Alternatively, the lignocellulosic material may be in the form of a low density soft board, i.e. a soft board having a density of from 180 to 400 kg/m³, produced by a so-called wet process, or a hardboard process such as typified by the Temple-Inland Fibre Products or Masonite Corporation Operations.

Further alternatively, the lignocellulosic material may be in the form of a board precursor in sheet form, preferably a pre-pressed mat of MDF fibre which has not yet been subjected to the final high pressure pressing.

The soft board or board precursor must be such that the oil can penetrate through the soft board or board precursor during subsequent pressing, and that the liquid thermosetting resin may be intimately dispersed therein, so that a finished product with suitable characteristics is produced.

Natural plant fibres or particles, or end products from these, are comprised of hemi-celluloses, celluloses and lignin. An increase in the moisture content of these materials results in swelling because the cell wall polymers of the material contain hydroxyl or other oxygen containing groups that attract water through hydrogen bonding. The hemi-celluloses are the most hygroscopic. It is the moisture that swells the cell walls and causes the expansion of the material until the cell walls are saturated with water. This can obviously give rise to degradation as a result of attack by micro-organisms as well as bulking and dimensional instability which, in the case of board composites, can result in their destruction. This phenomenon applies to all of the lignocellulosic material groups described in this invention.

It is known to modify lignocellulosic materials chemically principally by the use of anhydrides and to synergistically resinate the material with isocyanate resins. The chemical modification of the celluloses serves to minimize the phenomenon of hydrogen bonding by reducing the number of available hydroxyl groups. However, it is the crux of this invention that water contact with these groups is minimized by the interposition of a hydrophobic cohesive film, formed by the mineral oil/thermosetting resin.

The crux of the invention is thus that the lignocellulosic material is impregnated with an impregnating composition which must comprise a mineral oil, and a liquid thermosetting resin dispersed therein.

The oil must be a mineral oil, preferably a low viscosity paraffinic or naphthenic mineral oil which is inert.

Examples of suitable mineral oils are:

Waksol-F, provided by the Carbo-Tar Division of Sasol Chemical Industries Limited of South Africa, which is a coal derived mineral oil of flash point of 107.5°C., a water content of 0.05% and a wax content of between 10 and 15% of a wax dissolved in the oil at elevated temperatures, the wax having a pour point of 30 to 40° C. The density of this oil is 0.9 g/cm³.

Parprol 22 of Engen (Mobil Chemicals) of South Africa being a low viscosity honey coloured petroleum derived paraffinic process oil, with or without wax inclusion. Parprol 22 has a density of 0.859 g/cm³, viscosity in cSt at 40° C. of 20.6 ($1cSt=1\times10^{-6}m^{2/S}$), carbon type analysis and percentages—aromatics 3, naphthenics 28, and paraffinics 69, a neutralization number mgKOH/g of 0.01, and a flash point of 196° C.

Shell Base Oil code MVI (P1300) with a polycyclic aromatic content of 2.9%, a sulphur percentage of 2%, a total acid number of 0.1 mg KOH/g.

Further examples are Quendilla 19, a process oil, or Transcal N, which is a low viscosity heat transfer oil, both by British Petroleum.

In general, it is the paraffinic oils as against the naphthenic oils that are preferred on grounds of cost. The mineral oils in the context of the invention are process oils for the purpose of water proofing the lignocellulosic materials and they are inert and do not cross link with the thermosetting resins, i.e isocyanate or novolac resins that may be used, there being no available hydroxyl or other reactive groups in their chemical make up.

The impregnating composition must also include a liquid thermosetting resin, and, if necessary, a catalyst therefor.

The thermosetting resin is preferably an isocyanate thermosetting resin.

Isocyanates are compounds containing the group—N=C=O and are characterised by the general formula:

wherein x is variable and denotes the number of NCO groups, and R denotes a suitable group.

Examples of organic isocyanates include aromatic isocyanates such as m-and p-phenylenediisocyanate, toluene-2,4- and 2,6-diisocyanates, diphenylmethane-4,4'diisocyanate, diphenylmethane-2,4-diisocyanate, chlorophenylene-2,4-diisocyanate, diphenylene-4,4'-diisocyanate, 4,4'diisocyanate-3,3'dimethyldiphenyl, 3-methyldiphenylmethane-4,4'-diisocyanate and diphenyletherdiisocyanate, 2,4,6-triisocyanatotoluene and 2,4,4'-triisocyanatodiphenylether. There may be present mixtures of isocyanates for example a mixture of toluene diisocyanate isomers such as the commercially available mixtures of 2,4- and 2,6-isomers and also the mixtures of di and higher polyisocyanates produced by phosgenation of aniline/formaldehyde condensates. Such mixtures are well known in the art and include the crude phosgenation products containing mixtures of methylene bridged polyphenylpolyisocyanates including diisocyanate, triisocyanate and higher polyisocyanates together with any phosgenation by-products.

Preferred compositions are those wherein the isocyanate is an aromatic diisocyanate or polyisocyanate of higher functionality, in particular crude mixtures of methylene bridged polyphenylpolyisocyanates containing diisocyanate, triisocyanate and higher functionality polyisocyanates. The methylene bridged polyphenylpolyisocyanates are well known in the art and are sometimes referred to as polymeric methylene bridged polyphenyldiisocyanate (MDI) having an isocyanate functionality ranging from 2,5-3 and other products sometimes referred to as crude MDI having higher functionality. They are prepared by phosgenation of corresponding mixtures of polyamines obtained by condensation of aniline and formaldehyde.

Specific examples of suitable isocyanates are those having an (NCO) content percentage preferably exceeding 20%, more preferably exceeding 25%. These isocyanates promote latency or reduced reactivity because of the high number of NCO groups, and provide the maximum capacity for hydroxyl bonding. Examples are Desmadur VKS or Desmadur VK by Bayer, which are solvent free mixtures of aromatic polyisocyanates such as diphenyl methane-4,4 diisocyanate and polymeric matter. These and similar are among those referred to as MDIs in the industry. A further description used is a diisocyanate-diphenylmethane, further examples being Suprasec DNR-5005, which is a polymeric MDI, or Suprasec 2020 which is a monomeric MDI with available NCO percentages of 30.7% and 29% and which are polymeric MDI with standard functionality and monomeric MDI respectively. The Suprasec resins are supplied by ICI. A further example of a crude MDI is Voronate M 229 by Dow Chemical Company.

Further suitable diisocyanates are the toluene diisocyanates with the alternative names tolylene diisocyanate or toluylene diisocyanate with the abbreviation TDI, such as Desmadur L75 by Bayer.

It is to be noted that the term "isocyanate thermosetting resin" is intended to include the resins per se, as well as those components which may be regarded as precursors of the resins, such as MDIs and TDIs.

A further example of the principle of wood esterification is the use of ethyl isocyanate which react with hydroxyl groups to form ethyl carbamate (urethane) according to the formula:

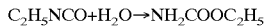

The isocyanate resins react with the hydroxyl groups on the cellulose and hemi cellulose molecules of the lignocellulosic material to form a wood ester. In this way they form a chemical bond adhesion rather than a cohesive adhesion. The isocyanates help bind the mineral oil into the lignocellulosic matrix.

Other examples of suitable thermosetting resins are as follows:

Epoxy resins such as the Epikote series by Shell Chemicals or Araldite PY 340.2 by Ciba-Geigy, with latent heat triggered catalysts in the range of 80° C. such as the boron trifluorides by Anchor Chemicals or aromatic such as Ancamine SRX.

Methyl methacrylates, acrylics or methacrylic acid esters, with appropriate catalysts.

The liquid thermosetting resin is preferably used in an amount of from 1% to 20% inclusive, more preferably from 2% to 10% inclusive by mass of the mass of the dry lignocellulosic material.

The mineral oil is preferably used in an amount of from 5% to 30% inclusive, more preferably in an amount of from 10% to 20% inclusive by mass of the mass of the dry lignocellulosic material.

It is to be noted that the amounts of liquid thermosetting resin and mineral oil to be used are given on the mass of the dry lignocellulosic material. In this regard, in the method of the present invention it is desirable that the mineral oil and liquid thermosetting resin be applied to the lignocellulosic material after it has been dried to a desired moisture percentage, generally of between 5 and 20% inclusive by mass. Thus, by dry lignocellulosic material, there is meant a lignocellulosic material with a moisture percentage of between 5% and 20% inclusive by mass. Further, as has been stated above, the mineral oil is applied in the absence of water or a non-aqueous solvent for the mineral oil. This obviates the need to remove the solvent before further processing.

When the lignocellulosic material is lignocellulosic particles or fibres, the method of the invention preferably includes step (c), before step (a) or step (b), of applying to the lignocellulosic material a thermosetting resin in finely divided dry powder form, and, if necessary, a catalyst therefor so that the thermosetting resin adheres to the surface of the lignocellulosic material.

The thermosetting resin is preferably a novolac resin, based upon phenol and formaldehyde, such as a resin where the molar ratio of phenol to formaldehyde exceeds parity, or one modified with cashew nut oil extracts or used in conjunction with cashew nut oil long chain alkyl prepolymers, and which may contain a catalyst such as hexamethylene tetramine. These products, on decomposition with heat, give rise to a source of formaldehyde inducing the condensation of the polymer to form a three dimensional stable network with minimal shrinkage, and which is hard, strong and water insoluble.

Examples of suitable novolac resins are those of BP Chemicals Code CH113; a cashew nut prepolymer also from BP Chemicals J3100L; or Schennectady SA 891 or PRP 3337 by Polyresin Products of South Africa, which are long flow novolac resins.

The thermosetting resin in finely divided dry powder form is preferably used in an amount of from 0% to 20% inclusive, more preferably in an amount of from 3% to 10% inclusive by mass of the mass of the dry lignocellulosic material.

The impregnating composition may also include a preservative, such as a bactericide, fungicide or insecticide or the like, particularly a termiticide, preferably in an amount of from 0.25% to 10% by mass of the impregnating composition of the preservative. Examples of biocides are complexes of boron, atrazines, thiazoles or carbamates, and of termiticides are zinc or copper naphthanates, pyrethroids, oil compatible high boiling point tar acids, pentachlorophenol or tri-butyl tin oxide-lindanes.

The impregnating composition may also include other additives as set out below.

Fire or flame retardant chemicals may be added to the impregnating composition to great advantage. Considerable compatibility exists with the other components of the impregnating composition and the flame retardants used are selected for their solubility in the solvents of choice. Examples are Flyrol FR2-LV by Akzo Chemicals which is a tris(1,3-dichloroisopropyl) phosphate and Flyrol DMMP which is a dimethyl methalphosphenate with a phosphorus content of 25% and an acid number of 1.3 mgKOH/g. This also acts as an effective viscosity depressant. Flame retardants are added in the proportion of 0.25 to 5% of the total mass of the impregnating composition.

The impregnating composition of the invention may also include a wax soluble in the impregnating composition.

The first step of the method of the invention is to impregnate the lignocellulosic material with the impregnating composition. This may be achieved in any suitable manner.

For example, when the lignocellulosic material is in particulate or fibre form, the impregnating composition may be applied to the particles or fibres by a finely atomised spray in a blow line, followed, optionally, by the application of a thermosetting resin in finely divided dry powder form at a downstream position in the blow line.

Alternatively, and again when the lignocellulosic material is in particulate or fibre form, the impregnating composition may be fed into a mixer and mixed with the particles or fibres, for example utilising conventional mixing equipment such as ribbon, screw or paddle blenders, followed optionally by the post application of a thermosetting resin in finely divided dry powder form.

Further, alternatively, when the lignocellulosic material is a soft board, or a board precursor, the impregnating composition may be applied to the board or board precursor, on one or both sides by curtain coater, roller coater or in a spray. It must be ensured that impregnation is throughout the thickness of the board or board precursor, which may be ensured by subjecting the board or board precursor to suitable conditions of pressure and temperature propagating through penetration and intimate impregnation by the impregnating composition, before resin polymerisation goes to completion.

The board or board precursor, during this process, may thereafter be pressed into a flat or a shaped profile.

The second step of the method of the invention is to compress the impregnated lignocellulosic material with heating in a suitable press or flat or profiled mould to allow the oil present to infuse the particles or fibres or board or board precursor and to allow any resin present to polymerise to form the finished product.

For example, the lignocellulosic material may be compressed and heated in a suitable press or mould at a temperature between 120° C. and 250° C. inclusive, preferably from 130° C. to 220° C. inclusive, and pressures of from 2 to 70 kg/m$^3$ inclusive.

As stated above, the third optional step of the method of the invention is to apply to the lignocellulosic particles or fibres, before step (a) or preferably before step (b), a thermosetting resin in finely divided dry powder form and, if necessary, a catalyst therefor. Methods of achieving this have been described above.

The use of an impregnating composition containing a mineral oil has several advantages. Firstly, the mineral oil serves as a carrier for the liquid thermosetting resin, so that the liquid thermosetting resin may be dispersed in finely divided very small droplet form. Because the mineral oil has no volatiles, this increases the safety of the resination system, preventing escape of the droplets into the atmosphere.

In addition, very low percentages of the liquid thermosetting resin may be applied to the lignocellulosic material while still maintaining uniform and reliable distribution and without adding any water, or other solvent that may interfere with final product production when temperature and pressure are applied.

In addition, the mineral oil acts as a hydrophobic agent preventing water penetration and, in addition, preventing movement of water through the treated lignocellulosic material by capillarity.

Finally, the oil ensures that the finely divided dry powder thermosetting resin, when used, adheres firmly to the surfaces of the lignocellulosic material.

As an example to illustrate the efficacy of the use of the impregnating composition, MDF made by the method of the invention exhibits water swell after 24 hours of water immersion of less than 3% and water absorption of less than 6%, as compared to an untreated material with a water swell of 30% and a water absorption of 70%.

Examples of the method of the invention will now be given.

EXAMPLE 1

An impregnating composition is formulated as follows:
Liquid MDI—60 g
Quendilla 19—a paraffinic mineral oil by BP—175 g The liquid MDI is dispersed in the mineral oil, in the absence of a solvent. 1200 g of wood chips are impregnated with the impregnating composition.

Thereafter, there is applied to the impregnated wood chips 90 g of a novolac resin, viz. PRP 3337 by Polyresin Products, which is a long flow, medium reactivity novolac resin in finely divided (200 mesh or finer) dry powder form. The particles of novolac resin adhere to the impregnated wood chips.

Thereafter, the impregnated and resinated wood chips are pressed to form a board of 975 kg/cm$^2$ density, at a pressure of about 25 kg/m$^3$ at a temperature of 210° C., for a period of about 8 seconds per mm thickness.

The board so formed may be used for applications of exposure to damp.

EXAMPLE 2

A soft board of density 225 kg/m$^3$ and a thickness of 14 mm is desiccated in a dryer to 2% moisture by mass.

An impregnating composition comprising a dispersion of 25% by mass of MDI Suprasec 5005 by ICI or Desmodur VKS by Bayer, in 75% by mass of Waksol F by Sasol Chemicals (a wax in coal derived low viscosity mineral oil) is applied to the soft board by a curtain coater at a rate of 1.5 kg/m$^3$, with 66% on the top surface of the board and 34% on the bottom surface of the board.

Thereafter the board is pressed between profiled platens at a pressure of 50 kg/cm$^2$ and a temperature of 180° C. to form a weather resistant door skin of 4 mm thickness and a density of 1170 kg/m$^3$.

What is claimed is:

1. A method of preparing an impregnated lignocellulosic material from a lignocellulosic material selected from the group consisting of lignocellulosic particles or fibres, soft boards, and board precursors in sheet form, for the manufacture of a finished product, comprising:
    (a) impregnating the lignocellulosic material with an impregnating composition comprising:
        (i) a mineral oil, and
        (ii) a liquid thermosetting resin and, if necessary a catalyst therefor;
        in the form of a dispersion of the liquid resin in the mineral oil, said impregnating composition containing no water and no non-aqueous solvent for the mineral oil, the liquid thermosetting resin being used in an amount of from 1% to 20% inclusive by mass of the lignocellulosic material on a dry basis and the mineral oil being used in an amount of from 5% to 30% inclusive by mass of the lignocellulosic material on a dry basis.

2. A method according to claim 1, wherein the lignocellulosic material is lignocellulosic particles or fibres and the method includes the step of:
    (b) before or after step (a), applying to the lignocellulosic material a thermosetting resin in finely divided dry powder form and, if necessary, a catalyst therefor so that the thermosetting resin in finely divided dry powder form adheres to the surfaces of the lignocellulosic material.

3. A method according to claim 1 or claim 2 wherein the liquid thermosetting resin used in step (a) is an isocyanate thermosetting resin or a precursor thereof, optionally with a catalyst therefor.

4. A method according to claim 3 wherein the thermosetting resin used in step (a) is a resin derived from diphenylmethane-4,4'-diisocyanate, optionally with a catalyst therefor.

5. A method according to claim 1 or claim 2 wherein the liquid thermosetting resin used in step (a) is selected from the group consisting of epoxy resins, and methyl methacrylate, acrylic and methacrylic acid ester resins.

6. A method according to claim 2 wherein the thermosetting resin used in step (b) is a novolac resin.

7. A method according to claim 1 wherein the liquid thermosetting resin used in step (a) is used in an amount of from 2% to 10% inclusive by mass of the mass of the dry lignocellulosic material and the mineral oil used in step (a) is used in an amount of from 10% to 20% by mass of the mass of the dry lignocellulosic material.

8. A method according to claim 2 wherein the thermosetting resin in finely divided dry powder form used in step (b), is used in an amount of up to 20% inclusive by mass of the dry lignocellulosic material.

9. A method according to claim 8 wherein the thermosetting resin in finely divided dry powder form used in step (b) is used in an amount of from 3% to 10% inclusive by mass of the mass of the dry lignocellulosic material.

10. A method according to claim 1 wherein prior to step (a) the lignocellulosic material is dried to a moisture percentage of between 5% and 20% by mass inclusive.

11. A method according to claim 1 wherein in step (a) the lignocellulosic material is impregnated with the impregnating composition by spraying or coating the impregnating composition onto the lignocellulosic material.

12. A method according to claim 1 wherein in step (a) the lignocellulosic material is impregnated with the impregnating composition by mixing the impregnating composition with the lignocellulosic material in particle or fibre form in mixing equipment.

13. A method according to claim 1 wherein when the lignocellulosic material is a soft board or a board precursor in sheet form, in step (a) the lignocellulosic material is impregnated with the impregnating composition by applying the impregnating composition to the board or the board precursor in sheet form on one or both sides by coating, spraying or immersion.

14. A method according to claim 1 wherein the impregnating composition includes a preservative in an amount of from 0.25% to 10% inclusive by mass of the mass of the impregnating composition.

15. A method of manufacturing a finished product from an impregnated lignocellulosic material prepared by a method according to claim 1, comprising the further step of:
    (c) compressing the impregnated lignocellulosic material with heating to allow the mineral oil to infuse into the lignocellulosic material and to polymerise the thermosetting resin to form the finished product.

16. A method according to claim 15 wherein in step (c) the impregnated lignocellulosic material is compressed and heated in a press or mould at a temperature between 120 and 250° C. inclusive and at a pressure of from 2 to 70 kg/cm$^2$ inclusive for a time of from 5 seconds to 20 seconds inclusive per mm of thickness.

* * * * *